April 2, 1963 S. T. MEYERS 3,084,231

REMOTE TESTING ARRANGEMENT

Filed Feb. 27, 1961 2 Sheets-Sheet 1

INVENTOR
S. T. MEYERS
BY J. P. Kearns, Jr.
ATTORNEY

INVENTOR
S. T. MEYERS
BY
J. P. Kearns, Jr.
ATTORNEY

United States Patent Office 3,084,231

Patented Apr. 2, 1963

3,084,231

REMOTE TESTING ARRANGEMENT

Stanley T. Meyers, East Orange, N.J., assignor to Bell Telephone Laboratories, Incorporated, New York, N.Y., a corporation of New York Filed Feb. 27, 1961, Ser. No. 91,795
7 Claims. (Cl. 179—175)

This invention relates in general to the remote testing of electrical communications circuits and in particular to remote testing arrangements for two-way data transmission apparatus.

With the advent of two-way data transmission between telephone subscribers over the public switched telephone network, it becomes expedient to devise ways of remotely testing the subscriber's data transmission and reception apparatus from the telephone central office at frequent intervals because of the more stringent requirements of data transmission service and because of the greater complexity of such apparatus as compared to voice telephone apparatus. Noise levels, for example, on telephone lines, which might impair voice transmission and be irritating to the talkers, do not necessarily destroy the ability to conduct an intelligible conversation. However, these same noise levels may so increase the error rate in data transmission as to destroy intelligibility. Therefore, the periodic checking of overall operating margins of the data transmitting and receiving apparatus located on subscriber premises for preventive maintenance purposes from the telephone central office becomes highly desirable.

Accordingly, it is an object of this invention to test the operating margins of data transmitting and receiving apparatus located on subscriber premises over telephone lines remotely from a central test location.

It is a further object of this invention to test the two-way transmission capabilities of subscriber data transceiver apparatus without gaining physical access to the subscriber's premises.

It is another object of this invention to enable the initiation of the testing of subscriber located data transceiver apparatus by the use of only momentary personal assistance of the subscriber.

It is still another object of this invention to permit the remote testing of subscriber located data transceiver apparatus with the minimum of permanently installed auxiliary equipment.

It is still another object of this invention to perform overall operational tests on subscriber data transceiver apparatus with simple circuit arrangements.

According to this invention, subscriber apparatus for two-way data transmission over the switched telephone network is provided with auxiliary equipment for connecting the output of the receiving side of the apparatus to the transmitting side whereby test signals from a central testing location are looped back to such test location after passing through both transmitting and receiving sides. The auxiliary equipment also properly terminates all associated input and output lines in their proper impedances during test operations.

In order to operate the auxiliary equipment, it is necessary to gain the assistance of the subscriber only to effect initial operation of the auxiliary apparatus. Control of the auxiliary apparatus then is transferred to the remotely located tester who may then proceed with overall operational checks by the use of test frequencies and may release the auxiliary equipment without further assistance from the subscriber.

The principles of this invention are described with reference to a particular embodiment of a data transmission system employing frequency-shifted marking and spacing frequencies. A variable frequency oscillator at the test location can be adjusted to cause the subscriber's apparatus to generate either marking or spacing frequencies. Transmission level at the data transmitter, as well as receiver sensitivity, can then readily be measured with conventional test apparatus. The marking and spacing frequencies transmitted by the subscriber's apparatus can also be compared with the output of the calibrated test oscillator.

The cost of the auxiliary apparatus which must be permanently installed in the subscriber's apparatus is more than offset by the reduction in the cost of installer visits to the subscriber's premises which might otherwise be necessary. Preventive maintenance checks can also be run as a routine matter and thus anticipate possible subscriber complaints. Serious malfunctions in the subscriber's apparatus can be analyzed with minimum inconvenience to the subscriber.

The principles of this invention, together with its objects, features and advantages, can be more fully appreciated from a consideration of the following detailed description and the drawing in which.

Before proceeding to a description of the operating principles of this invention, a data communications system to which these principles can be most conveniently adapted will be described briefly. A frequency-shift data communication system capable of employment on conventional voice telephone lines is assumed for purposes of illustration. In such a system the subscriber furnishes from his own data-handling equipment intelligence messages encoded in binary form as a sequence of negative marking "1" bits and positive spacing "0" bits. These messages he desires to transmit from one geographical location to another. He also desires two-way data communication between these geographical locations.

Conventional telephone lines, as distinguished from those made available for leased private wire services, have restricted bandwidths and are particularly deficient at the low and high ends of the pass band. Therefore, direct-current signals cannot reliably be transmitted over all parts of the circuit. It then becomes a requirement for data transmission over these lines that the direct-current signals emanating from the subscriber's data-handling equipment be modulated on carrier frequencies located in the midrange of the voice-frequency transmission band. In the frequency-shift system to which the remote testing arrangement of this invention can be applied, marking signals are transmitted as intervals of a 1200 cycle-per-second carrier and spacing signals as intervals of a 2200 cycle-per-second carrier. At the receiving terminal these frequencies are detected and the direct-current marking and spacing signals are recovered in their original form.

Since the data signals are translated to a form suitable for transmission over voice-frequency telephone lines, it is convenient for these data signals to be made to share the same transmission loop to the telephone central office as the conventional telephone subscriber's set. Accordingly, the subscriber's apparatus is an integrated voice telephone and data transceiver, both sharing the same telephone subscriber's loop. The subscriber's apparatus is envisioned as an instrument which is normally in the talking mode and receives audible ringing signals in the conventional manner. Preliminary arrangements for handling data calls are made by voice after which an exclusion switch provided on the apparatus is operated to place the apparatus in the data mode. Each subscriber's apparatus includes a data transmitter which, for the sake of specific example, may be of the type shown in FIG. 2, and a data receiver which may be of the type shown in FIG. 3.

Figure 2:
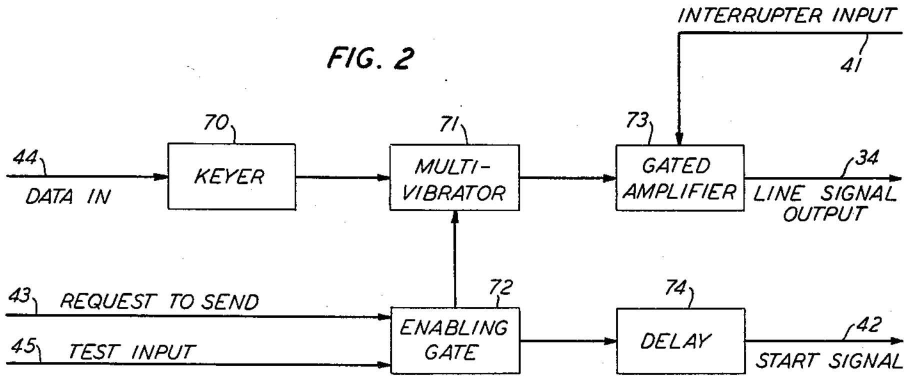
FIG. 2 is a block diagram of the transmitter section of a subscriber's data transceiver capable of being tested remotely using the principles of this invention.

The transmitter of the frequency-shift data transceiver shown in FIG. 2 accepts data in direct-current binary form on lead 44 and delivers it to the telephone line on lead 34 as a succession of 1200 and 2200 cycle-per-second signal intervals. The basic operation of the transmitter is that of a frequency modulator such as is disclosed in U.S. Patent 2,894,215, granted July 7, 1959 to W. N. Toy. This frequency modulator employs a transistor multivibrator whose frequency of operation is a linear function of the input voltage. A keying or triggering network switches between voltage levels which cause operation of the multivibrator at frequencies of 1200 or 2200 cycles per second.

The multivibrator is indicated in FIG. 2 by block 71 and the keying network by block 70. In a practical embodiment the inputs $E_1$ and $E_2$ in FIG. 2 of the Toy patent are connected in parallel to the output of keyer 70. Keyer 70 responsive to a marking input signal gates a voltage source of potential $E_1$ to multivibrator 71 to cause the latter to oscillate at 1200 cycles per second; and, responsive to a spacing input signal, gates another voltage source of potential $E_2$ to cause oscillation at 2200 cycles per second. The output of the multivibrator is connected to the output line 34 through an amplifier 73, which in the normal state is gated on. Amplifier 73 may include a low-pass filter to limit the output of the amplifier to frequencies within the voice-frequency band. When the subscriber's apparatus is in the talking mode, there is no need for the multivibrator to be in operation. Therefore, enabling circuit 72 provides a ground connection to the multivibrator only when a request-to-send signal is received on lead 43. The enabling circuit may also be operated under test conditions by an input on lead 45, as explained more fully hereinafter. Another output from the enabling gate is provided through delay network 74 as a start-to-send signal on lead 42 to the data-handling equipment. Enabling gate 72 may be a transistor switch well known in the art. Delay element 74 may be a simple resistor-capacitor time constant circuit.

Figure 3:
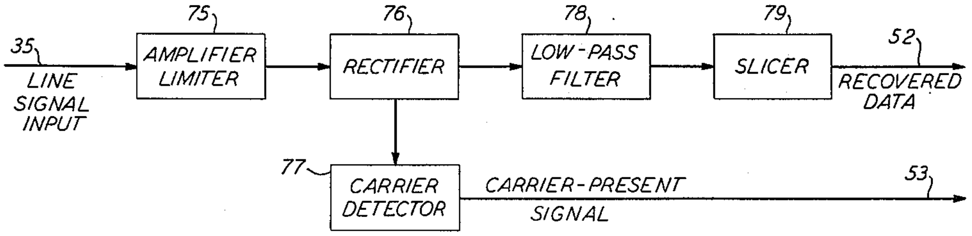
FIG. 3 is a block diagram of the receiver section of a subscriber's data transceiver adaptable to being tested remotely using the principles of this invention.

The receiver of the frequency-shift data transceiver shown in FIG. 3 accepts a frequency-shifted line signal on lead 35 and delivers recovered binary data in direct-current form on output lead 52 to the subscriber's data-handling equipment. The frequency-shift line signal is passed through a bandpass filter (not shown) to eliminate line noise falling outside the signal band. Conventional delay and attenuation equalizing circuits may also be included in a practical circuit. The band-limited signal is next amplified and limited in amplifier-limiter block 75 to produce square waves having zero-crossing transitions matching those in the transmitted wave. The square wave is differentiated in the output of the limiter to produce positive and negative pulses. These pulses are then passed through full-wave rectifier 76 to obtain pulses of a single polarity. It will be found that these pulses are of substantially constant width but with variable spacing depending on the frequency of the square waves from which they were derived. Accordingly, when the pulses from rectifier 76 pass through low-pass filter 78 an integrated direct-current wave results which alternates between two discrete levels, depending on the spacing between pulses. Slicer 79, driven by this direct-current wave, is a threshold device having an output of one polarity, for example, for a no-signal input or an input signal below the established threshold or slicing level and an output of opposite polarity for inputs exceeding the threshold level. The one input level corresponding to the marking frequency of 1200 cycles per second is too low in amplitude to change the output state of the bistable slicer and leaves the output of the slicer in a negative marking condition since the marking signal has fewer zero crossings per unit of time than the spacing frequency of 2200 cycles per second. Similarly, the higher level input from the low-pass filter, corresponding to the spacing signal, changes the state of the slicer, which then furnishes a positive output. The signal appearing on output lead 52 is thus a reproduction of the original data signal furnished to the transmitter of FIG. 2.

The frequency demodulator shown in FIG. 3 is essentially of the form disclosed in U.S. Patent 2,441,957, granted to L. A. De Rosa on May 25, 1948.

Carrier detector 77 receives an output from rectifier 76, as shown, and furnishes a positive output on lead 53 whenever either frequency is received. Detector 77 may be a simple transistor switch well known in the art controlled by a charge appearing on an input capacitor whenever a line signal is present.

Figure 4:
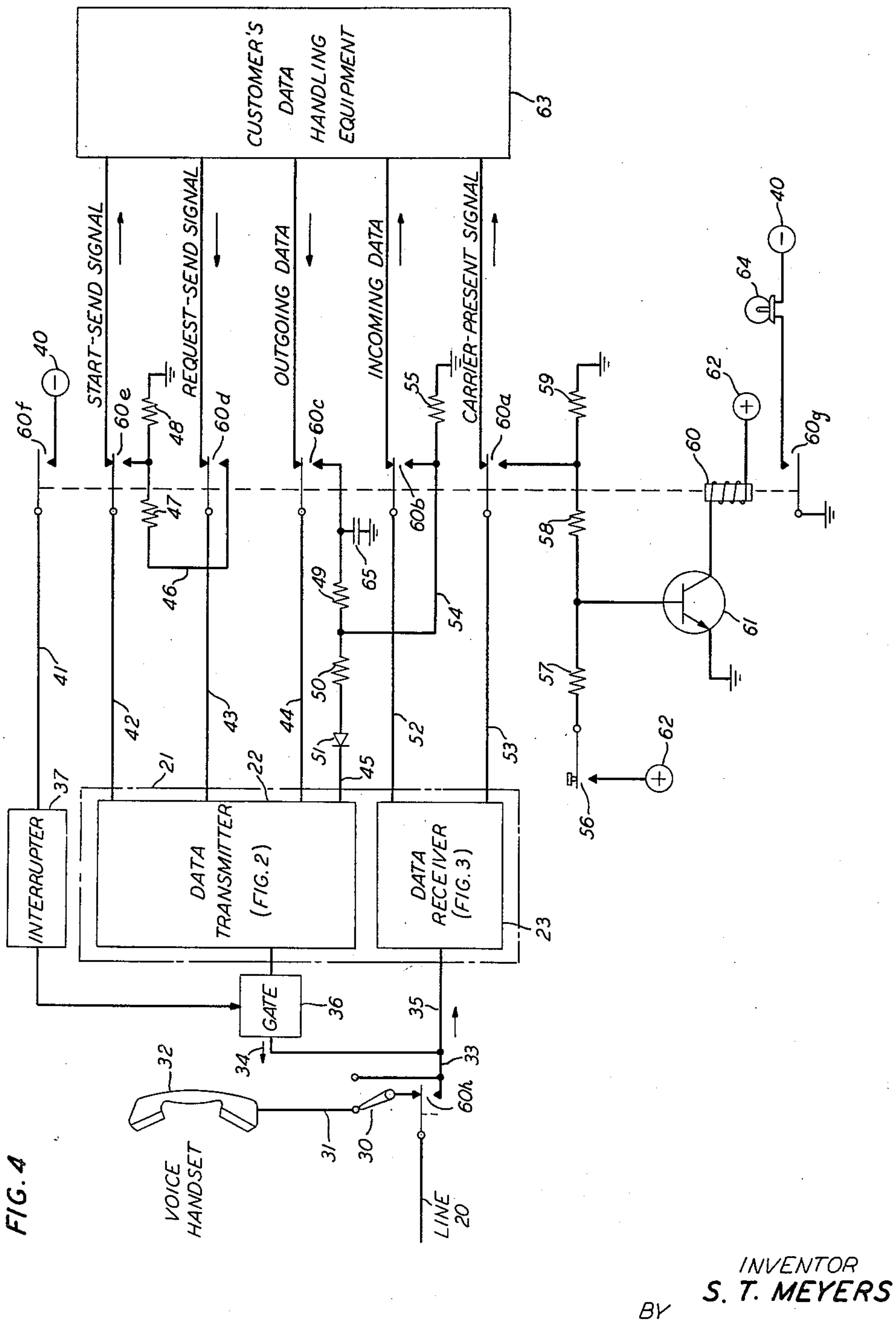
FIG. 4 is a combined block and schematic diagram of typical auxiliary apparatus to be incorporated into a subscriber's data apparatus for the purpose of exploiting the principles of this invention.

The remote testing arrangement of this invention as it affects the subscriber's apparatus is shown in FIG. 4. The incoming telephone line 20 connects through exclusion switch 30 to either handset 32 by way of line 31 as shown or to data line 33. The additional contacts **60*h* will be discussed below. The latter contacts are assumed to be normally held in the position shown. Normally, the line 20 is connected to the voice handset, which will be understood to include the normal auxiliary apparatus of a telephone subscriber's set including ringer and networks. After the operator has been notified that a caller intends to transmit a data call, he actuates exclusion switch 30 to connect the incoming line to the data transceiver 21. The data transceiver 21 includes a transmitter 22 and a receiver 23. These two units are normally connected in a completed installation to customer's data-handling equipment 63 by way of a network of interchange control leads 42, 43, 44, 52 and 53**. The function of these leads is designated on the drawing, together with arrows indicating the direction in which signals normally pass on these leads.

An incoming line signal passes through exclusion or data-talk switch 30, over leads 33 and 35 to receiver 23. The data recovered, as explained above in connection with FIG. 3, passes over lead 52 to data-handling equipment 63. The carrier-present signal on lead 53 may be used in any way the customer desires such as to light a lamp indicating that a signal is being received.

For an outgoing signal the customer's equipment delivers a request-to-send signal on lead 43 to enable the data transmitter. After a delay required to start up the multivibrator in the transmitter, to condition telephone line apparatus such as echo suppressors, and to release any constraints on the receiver for noise protection in the idle condition, a start-to-send signal is returned to the customer's equipment. The positive and negative data signals are then furnished to transmitter 22 on lead 44 to control the frequency-shift output of the transmitter.

The foregoing description of the subscriber's apparatus does not include the auxiliary equipment necessary for remote testing according to this invention. The auxiliary equipment comprises test relay 60, having contacts **60*a* through 60*h*, transistor 61, thermal interrupter 37, and the several terminating resistors, capacitor and diode shown connected to the relay contacts. The contacts are shown in the released non-test condition of relay 60**.

Test relay 60 has an operating winding connected in series with a source of positive potential 62 and the collector circuit of a junction transistor 61. The emitter electrode of the transistor 61 is grounded. The base electrode of the transistor is connected to a junction of two resistors 57 and 58 forming part of a voltage divider which also includes resistor 59. Resistor 59 has one terminal returned to a ground reference point as shown, and terminates the output of the carrier-present circuit of receiver 23 in the test condition. The end of resistor 57 remote from its junction with resistor 58 is joined to a momentary contact switch 56, preferably of the push-button type. The other contact of switch 56 connects to positive potential source 62. The junction of resistors 58 and 59 is connected to the break side of transfer contact 60*a*.

The break side of contact 60*a* normally connects lead 53 from receiver 23 to data-handling equipment 63.

The make side of contact 60*b* is connected to the junction between resistor 55 and a lead 54. Resistor 55 terminates the data output of receiver 23 in the test condition. Lead 54 connects the data output of receiver 23 to the test input of transmitter 22 in the test condition. The break side of contact 60*b* normally connects the data output of the receiver 23 to the data-handling equipment 63.

The make side of contact 60*c* is connected to a test lead 45 through a coupling network comprising capacitor 65 with one side grounded, series resistors 49 and 50 and diode 51 poled for easy current flow into transmitter 22. The junction of resistors 49 and 50 is connected to lead 54. The break side of contact 60*c* normally connects lead 44 to the data-handling equipment 63.

The make side of contact 60*d* connects to a lead 46. The break side normally connects lead 43 to the data-handling equipment.

The make side of contact 60*e* connects to the junction of resistors 47 and 48. The other end of resistor 48 is grounded to terminate the start-send output lead 42 in the test condition. The other end of resistor 47 is connected to lead 46. The break side of contact 60*e* normally connects lead 42 to the data-handling equipment.

Contact 60*f*, normally open, is connected to a negative potential source 40 and to a lead 41. The latter lead connects to interrupter 37.

Contact 60*g*, normally open, is provided to operate test lamp 64, which has one terminal connected to negative potential source 40. The spring of contact 60*g* is grounded.

Contact 60*h*, normally operated as shown, has its break side in series with the spring of exclusion switch 30 and its make side in parallel with the make side of exclusion switch 30. The spring thereof connects to line 20 as shown.

Interrupter 37 may be of the thermal type which opens as current flows therethrough causing its bimetallic element to flex. After the current flow ceases the interrupter closes to allow further current flow.

Figure 1:
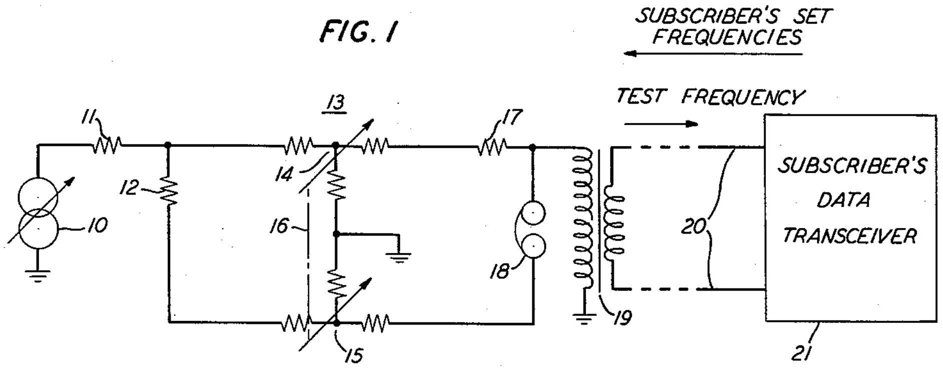
FIG. 1 is a schematic representation of a test circuit to be employed in making operational tests of a subscriber's data transceiver from a remote test location.

FIG. 1 shows the overall test arrangement with all elements to the left of telephone line 20 being located at the central test location and transceiver 21 being located on the subscriber's premises. An oscillator 10, calibrated with respect to frequency, feeds an attenuator 13, shown as having two sections 14 and 15 ganged together by mechanical connection 16. A matching transformer 19 intercouples the output of the attenuator to the telephone line 20. A listening device, such as the pair of headphones 18 shown, is connected to the primary winding of transformer 19. Resistors 11, 12 and 17 serve as impedance matching devices in a well known manner. Attenuator portion 14 controls the signal level applied to the line and the headphones 18 while attenuator portion 15 controls the level of the signal applied to headphones 18. The latter are so connected that both an outgoing and an incoming signal can be heard and compared in frequency and amplitude. Sections 14 and 15 of attenuator 13 are initially adjusted so that only a predetermined portion of the output of the test oscillator is impressed on headphones 18.

The procedure to be employed in conducting a test from the central test location involves ringing up the subscriber in the usual way. The tester sets the frequency of oscillator 10 near the mark frequency of 1200 cycles per second. When the subscriber responds, he is informed of the tests to be made and is asked to press the test button 56 until test indicator lamp 64 lights and remains lighted. Contacts 60*h* operate and effectively bypass the exclusion switch contacts 30 to place the subscriber's apparatus in the data mode. The subscriber is then relieved of any further duties with respect to the tests to be conducted remotely from the central test location. The subscriber is denied the use of the data set only until tests are complete and the test lamp is extinguished. The handset may even be returned to its cradle.

Operation of the test relay 60 in FIG. 4 by the subscriber pulls up all relay contacts and opens all connections to the customer's data-handling equipment 63. The test relay is operated by the fact that transistor 61 is turned on by the momentary application of positive potential from source 62 to its base electrode. The operating coil of relay 60 is included in the collector circuit of transistor 61. The 1200-cycle signal from the test location is detected in data receiving 39 and causes a positive output on lead 53 which in turn holds transistor 61 on.

The 1200-cycle test signal also causes a negative marking output on lead 52 which is now terminated in resistor 55. This marking output is coupled by way of lead 54 to the junction of resistors 49 and 50. However, it cannot reach test lead 45 because of the presence of diode 51, which is back-biased by the negative signal. Therefore, no effect is produced in data transmitter 38, and no line signal is returned to the central test location. This is the first phase of the test.

The tester now proceeds to change the frequency of oscillator 10 upward toward the spacing frequency of 2200 cycles per second. At some point in the rise, slicer 79 in FIG. 3 switches to the spacing condition and produces a positive output on lead 52. At this time diode 51 in lead 45 of FIG. 4 is forward biased and enabling gate 72 in FIG. 2 is closed to ground. The positive potential on lead 54 of FIG. 4 is also coupled by way of resistor 49, capacitor 65 and contact 60*c* to data input lead 44. Multivibrator 71 is thus caused to generate a square wave at a fundamental frequency of 2200 cycles per second. This tone is transmitted back over line 20 in FIG. 1 and can be detected in the headphones. This is the second phase of the test.

The test frequency at which the multivibrator is caused to change from no signal output to space frequency may be noted as a measure of the frequency at which the slicer operates as another phase of the test. The incoming frequency may be measured to determine the accuracy of the data set's spacing frequency. The determination of spacing frequency may be made by beating the test oscillator frequency against the frequency returned from the subscriber's set. In the alternative an oscilloscope may be used in place of the headphones to compare the return frequency with the output of the test oscillator.

The output from transmitter 22 in FIG. 4 passes through gated amplifier 36, which is opened and closed by interrupter 37 every two to four seconds to prevent the signal on lead 34 from locking the receiver 23 to the strong transmitter output rather than to the relatively weaker test signal. Without the interrupter receiver 23 could not be changed to a marking output when the test signal is reduced in frequency in the next phase of the test. Gate 36 may comprise a grounded emitter transistor amplifier in the output of the transmitter. The negative potential from the interrupter can be applied to the base electrode to cut off the transistor periodically. The transmitted signal is bypassed to ground through the collector circuit when the transistor is in saturation.

Once the data transmitter comes into operation a delayed positive start-to-send signal appears on lead 42, which is then coupled through contacts 60*e* and 60*d* and resistor 47 to request-to-send lead 43. The enabling gate 72 in FIG. 2 is then held closed independently of the test input on lead 45. If now the test frequency is reduced to the marking frequency, receiver 23 furnishes a negative output on lead 52 which is coupled to data input lead 44. The transmitter, if operating properly, changes to the marking frequency of 1200 cycles per second, which can now be measured at the test location. This is the fourth phase of the test.

The fact that the data transmitter can be changed from spacing to marking frequency, as above described, is an indication that the start-to-send signal is being properly generated and that the request-to-send input is operative.

A measurement of subscriber's set transmitting level can be made if the transmission loss between the test location and the subscriber's set is known. To measure the transmitting level it is only necessary to isolate the incoming signal from the test signal. This can be done either by suitable filtering or by a null cancellation of the test frequency at the listening input at the test location. A level measuring meter may be substituted for he headphones 18 in FIG. 1 to accomplish this measurement with accuracy.

Subscriber's set receiving sensitivity can be determined by noting the test oscillator level at which a loss of signal from the subscriber's set occurs as the test signal is reduced. This completes the remote testing of the subscriber's apparatus.

When all tests are complete, the subscriber's set is returned to service by removing the test signal from the line. On the next operation of interrupter 37 following the removal of the test signal the carrier detector output from receiver 23 in FIG. 4 goes negative and transistor 61 turns off, thus releasing test relay 60. All contacts on test relay 60 return to the state shown in the drawing. The indicator lamp extinguishes and the subscriber is informed that tests have been completed.

By the method of testing just described the more catastrophic failures in the subscriber's data communications transceiver can be made remotely from a central test location.

It would, of course, be possible for one skilled in the art to devise relay circuits operated from coded ringing tone or the like to replace the subscriber operated pushbutton, but this would increase the cost of a practical embodiment without in any way changing the operating principles of this invention.

While this invention has been described by way of application to a specific data communications subscriber's set, it will become obvious to one skilled in the art that the principles of this invention are applicable to a wide range of other types of transceiving apparatus connected to telephone lines where it is possible to connect the output of the receiver portion to the transmitter portion without causing sidetone problems. For example, an on-off amplitude modulation system may be tested with an interrupted tone. Similarly, a multifrequency data communications set may be tested using appropriate multifrequency test tones.

What is claimed is:

1. A remote testing arrangement for a subscriber frequency-shift data transceiver comprising a central test station, a remotely located subscriber's data set including a transmitter and a receiver, a common connection for the output of said transmitter and the input of said receiver, a pair of wires interconnecting said central station and said common connection, means for transmitting an adjustable frequency test tone over said pair of wires from said central station, a test relay in said subscriber's set for connecting the output of said receiver to the input of said transmitter such that an output signal from said receiver causes said transmitter to oscillate at one of two frequencies, switch means on said subscriber's set for manually operating said test relay, a further connection from the output of said receiver to said relay for holding it operated under the control of said test tone, and means at said central station for detecting and measuring the frequencies returned from said subscriber's set as said test tone is varied through its range.

2. A remote testing arrangement according to claim 1 in which a gating circuit is interposed between the output of the transmitter and said pair of wires, and an interrupting device opens and closes said gate circuit at a rate slow with respect to the holding time of said receiver to prevent permanent seizure of the receiver by the output of the transmitter.

3. A remote testing arrangement according to claim 2 in which said interrupting device is a thermally operated switch.

4. A remote testing arrangement for a subscriber's data communications set including a transmitter and receiver comprising: a telephone line, a signal generator for furnishing to one end of said line a test signal adapted to cause the output of said data receiver to assume one of two direct-current levels, means connecting the output of said transmitter and the input of said receiver to the other end of said line, detector means at one end of said line for determining the frequency and level of signals returned from said data transmitter, a test relay at said subscriber's set, means for initially operating said relay at said subscriber's set, means for holding said relay operated independently of said initial operating means under the control of said received test signal, contacts on said relay for connecting the data output of said receiver to the data input of said transmitter whereby the direct-current levels appearing at the output of said receiver in response to said test signal cause said transmitter to generate a return signal at one of two frequencies for transmission back to said detector means, and means for periodically blocking the output of said transmitter from said line and from the input of said receiver to assure sole effective control of the output of said receiver by said test signal.

5. A remote testing arrangement according to claim 4 in which said data communications set employs frequency-shift signals to represent binary data on said telephone line and said signal generator furnishes a test signal adjustable in frequency and magnitude over the operating range of said subscriber's set.

6. A remote testing arrangement according to claim 4 in which said detector means comprises an electrical-to-aural transducer in which the frequency of the signal returned from said subscriber's set can be heterodyned with the output of said signal generator to produce a zero beat indication when the frequency of the returned signal is the same as the frequency of the test signal.

7. In combination, a two-way data communications station capable of handling incoming and outgoing binary data in direct-current form only, a data receiver for translating incoming frequency-shift signals into direct-current form acceptable by said station and also for delivering a carrier-present signal to said station, a data transmitter for translating outgoing direct-current data signals from said station into one of two frequencies lying in a predetermined transmission band, said transmitter being held normally inoperative by an enabling gate, a first control lead connected between said station and the input of the enabling gate in said transmitter to carry a request-to-send signal preparatory to transmitting a data message, a second control lead connected between said station and the output of the enabling gate in said transmitter to carry a start-to-send signal back to said station, a central test location, a telephone transmission line, means for connecting said test location to one end of said transmission line, means for connecting said receiver and transmitter in parallel to the other end of said transmission line, a test relay at said station having a plurality of contacts in series with the several interconnections between said transmitter, receiver, and station, the operation of said relay breaking these connections, first contacts on said relay for connecting the data output of said receiver to the data input of said transmitter when said relay is operated, second contacts on said relay for connecting said first and second control leads together when said relay is operated whereby said transmitter is held enabled independently of the data output of said receiver, manual switch means for causing the initial operation of said test relay, third contacts on said relay for locking said relay to said carrier-present signal after the initial operation thereof, gating means in series with the output of said transmitter for interrupting the output thereof at a rate which will prevent said receiver from locking to the output of said transmitter, a test source at said test location connected to the one end of said transmission line for generating a test signal, and means for varying said test signal over the range of said normal frequency-shift signals whereby the operating characteristics of said transmitter and receiver can be measured remotely at said test location.

No references cited.